March 11, 1924.  
V. O. CRAWFORD  
ANTIBUTTING ATTACHMENT FOR ANIMALS  
Filed May 15, 1923
1,486,419
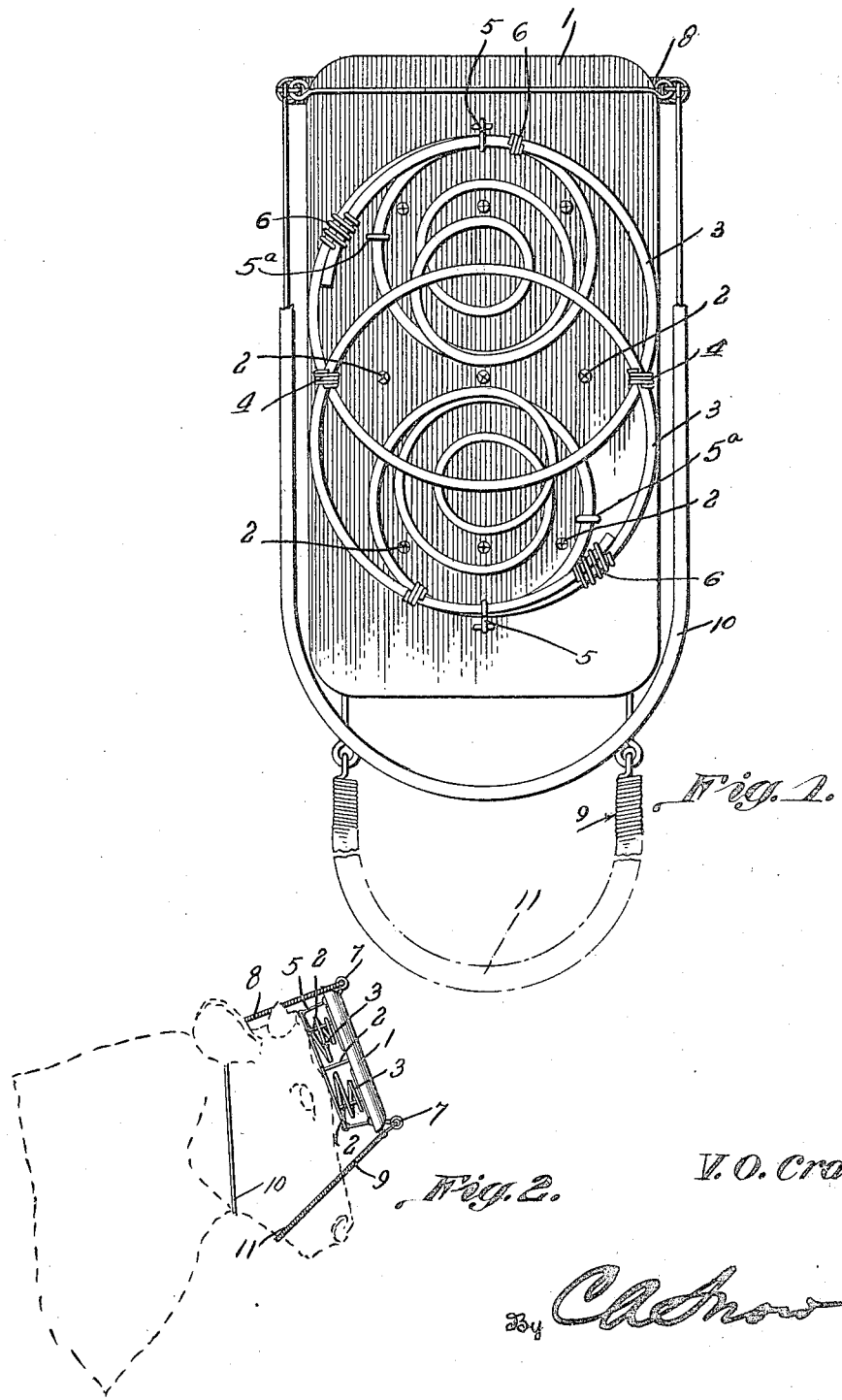

Patented Mar. 11, 1924.

1,486,419

UNITED STATES PATENT OFFICE.

VINYARD O. CRAWFORD, OF HEAVENER, OKLAHOMA.

ANTIBUTTING ATTACHMENT FOR ANIMALS.

Application filed May 15, 1923. Serial No. 639,179.

*To all whom it may concern:*

Be it known that I, VINYARD O. CRAWFORD, a citizen of the United States, residing at Heavener, in the county of Le Flore and State of Oklahoma, have invented a new and useful Antibutting Attachment for Animals, of which the following is a specification.

This invention relates to a crown-like protector for use on a bull or cow to prevent the animal from butting or horning persons or other animals.

The object of the invention is to provide a device of this character which is so constructed and mounted that the animal wearing it will be prodded by prongs on the device should he attempt to butt or horn.

Another object is to so construct such a device that it will not interfere with the sight or inconvenience the animal wearing it unless he attempts to butt or horn.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a rear elevation of the device constituting this invention with parts broken out; and Fig. 2 is a side elevation thereof shown applied.

In the embodiment illustrated the device constituting this invention comprises a plate-like member 1 preferably constructed of wood and of any desired configuration adapted for application to the face of a bull or cow, being here shown rectangular. This plate 1 is equipped with a plurality of rearwardly projecting prongs 2 any desired number of which may be employed and which may be of any desired length, preferably two or three inches. A plurality of spiral springs 3 are secured to the rear face of the plate 1, two being here shown the outer coils of which are larger than the others and lap each other and are secured together by coiled wire 4. Links 5 flexibly connect the outer coils of these springs with the plate 1. Fasteners 5ª connect the springs with the base plate at various points and are adapted to hold the springs in position to protect the prongs when the springs are in normal expanded position. The outer ends of the wires from which the springs are formed are shown secured to an adjacent coil by wires 6 wrapped therearound. When the device is applied these springs are designed to rest against the forehead and face of the animal as shown in Fig. 2.

The plate 1 is provided at its four corners on its outer face with screw eyes 7 designed to be used as connectors for the attaching elements 8 and 9 used to mount the device on the animal's head. The upper member 8 is made in the form of a spring coil threaded through the screw eyes 7 and which has connected to its free ends a throat encircling member 10 which member is preferably constructed of rubber covered wire as is shown clearly in Fig. 1. The member 11 is also composed of a flexible resilient coiled wire and which is designed to extend under the chin of the animal as is shown clearly in Fig. 2 whereby the device is held in operative position.

When the animal shown in Fig. 2 is equipped with the protector constituting the invention he will not be inconvenienced in any way unless he attempts to butt or horn which will cause the plate 1 to contact with the person or object he is attempting to butt and thereby force the prongs 2 into the animal's face which will have the effect of causing him to desist. Moreover the plate 1 preferably has its edges rounded and should the animal succeed in butting a person or another animal while wearing this protector it will not materially injure him and immediately the prongs become effective the animal will desist in his attempts to butt or horn.

It is of course understood that if the device is to be used with an animal having horns the springs 3 will be made of a length to correspond with the length of the horns so that there will be no danger of the horns being effective before the protector comes into play.

The device is simple in construction and is cheaply manufactured and easily applied and may be continuously worn by the animal without interfering in any way with his usual functions.

Various changes in the form, shape, proportion and other minor details of construction may be made without departing from the principle or sacrificing any of the advantages of the claimed invention.

I claim:—

In an anti-butting device for stock, a plate for application to the face of an animal, a plurality of prongs extending rearwardly from the rear face of said plate, a plurality of spiral springs secured to the rear face of said plate in lapping relation, and connected with each other, the springs being longer than the prongs when in normal position to hold the prongs out of engagement with the face of the animal, attaching elements in the form of coiled springs connected at their ends with the corners of said plate to form means for securing the device to the head of the animal, a throat encircling member connected with one of said springs, the other spring forming a chin engaging member.

In testimony that I claim the foregoing as my own, I have hereto affixed my signature in the presence of two witnesses.

VINYARD O. CRAWFORD.

Witnesses:
F. B. L. CARRINGTON.
E. J. FREEMAN.